(12) United States Patent
Pezeshki et al.

(10) Patent No.: US 11,792,798 B2
(45) Date of Patent: Oct. 17, 2023

(54) SYSTEM AND METHOD FOR SILENCING COMMUNICATION

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/185,818

(22) Filed: Feb. 25, 2021

(65) Prior Publication Data

US 2021/0266940 A1    Aug. 26, 2021

Related U.S. Application Data

(60) Provisional application No. 62/981,920, filed on Feb. 26, 2020.

(51) Int. Cl.
| | | |
|---|---|---|
| *H04W 72/04* | (2023.01) | |
| *H04W 72/20* | (2023.01) | |
| *H04W 52/02* | (2009.01) | |
| *H04W 72/23* | (2023.01) | |
| *H04L 5/00* | (2006.01) | |
| *H04W 72/542* | (2023.01) | |

(52) U.S. Cl.
CPC ....... *H04W 72/20* (2023.01); *H04W 52/0229* (2013.01); *H04W 72/23* (2023.01); *H04L 5/0055* (2013.01); *H04W 72/542* (2023.01)

(58) Field of Classification Search
CPC .............................. H04W 72/12; H04W 72/14
See application file for complete search history.

(56) References Cited

U.S. PATENT DOCUMENTS

| | | |
|---|---|---|
| 2012/0120854 A1 | 5/2012 | Zhang et al. |
| 2013/0343315 A1 | 12/2013 | Tiirola et al. |
| 2015/0326377 A1 | 11/2015 | Freda et al. |
| 2017/0303302 A1 | 10/2017 | Bagheri et al. |
| 2019/0342898 A1 | 11/2019 | Nam et al. |
| 2021/0135834 A1* | 5/2021 | Shimomura .......... H04W 72/20 |
| 2022/0217762 A1* | 7/2022 | Jeon ...................... H04L 5/0064 |

OTHER PUBLICATIONS

International Search Report and Written Opinion—PCT/US2021/020072—ISA/EPO—dated Jun. 4, 2021.

* cited by examiner

*Primary Examiner* — Sulaiman Nooristany
(74) *Attorney, Agent, or Firm* — Procopio, Cory, Hargreaves & Savitch LLP; Nerrie M. Zohn

(57) ABSTRACT

A configuration to suspend UE communication with a base station based on instructions from the base station. The apparatus receives, from a base station, a silencing instruction for at least one of uplink communication or downlink communication. The apparatus determines a first duration associated with the at least one of uplink communication or downlink communication based on the silencing instruction. The apparatus refrains from all of the at least one of uplink communication or downlink communication with the base station for the first duration in response to receiving the silencing instruction.

27 Claims, 8 Drawing Sheets

SYSTEM AND METHOD FOR SILENCING COMMUNICATION

CROSS REFERENCE TO RELATED APPLICATION(S)

This application claims the benefit of U.S. Provisional Application Ser. No. 62/981,920, entitled "System and Method for Silencing Communication" and filed on Feb. 26, 2020, which is expressly incorporated by reference herein in its entirety.

BACKGROUND

Technical Field

The present disclosure relates generally to communication systems, and more particularly, to a user equipment (UE) configured to refrain from communication with a base station based on an instruction.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some scenarios, a base station may determine that conditions on a channel on which the base station communicates with a user equipment (UE) have deteriorated to a point at which communication is appreciably affected. For example, the base station may determine that channel conditions have deteriorated when the base station receives a certain number of non-acknowledgement (NACK) feedback messages from the UE within a certain timeframe.

When channel conditions between a base station and a UE are relatively poor (e.g., such that multiple retransmissions are needed for each transmission), continuing to attempt communicate may be disadvantageous to both the base station and the UE. For example, continuing communication attempts may consume resources, such as power and/or processing resources. In addition, continuing communication attempts may introduce signaling overhead that negatively affects surrounding devices, such as other UEs and/or base stations, by causing interference and/or reducing the amount of available resources.

In view of the foregoing, a need exists for approaches to address scenarios in which a base station and a UE experience difficulty in communicating due to relatively poor channel conditions. The present disclosure describes various techniques and solutions for a base station and a UE if communication is adversely affected due to poor channel conditions. For example, in some aspects, a base station may determine to refrain from transmitting some periodic downlink data to a certain UE and/or refrain from receiving some periodic uplink data from that UE, such as if the base station determines that the channel conditions for the UE are poor (e.g., after consecutively receiving a certain number of NACK feedback messages from the UE).

In an aspect of the disclosure, a method, a computer-readable medium, and an apparatus are provided. The apparatus may be a device at a UE. The device may be a processor and/or a modem at a UE or the UE itself. The apparatus may receive, from a base station, a silencing instruction for at least one of uplink communication or downlink communication. The apparatus may determine a first duration associated with the at least one of uplink communication or downlink communication based on the silencing instruction. The apparatus may refrain from all of the at least one of uplink communication or downlink communication with the base station for the first duration in response to receiving the silencing instruction.

In an aspect of the disclosure, a method, a computer-readable medium, and an apparatus are provided. The apparatus may be a device at a base station. The device may be a processor and/or a modem at a base station or the base station itself. The apparatus may determine a first duration to suspend at least one of uplink communication or downlink communication with a UE. The apparatus may transmit, to the UE, a silencing instruction for the at least one of uplink communication or downlink communication indicating the first duration. The apparatus may refrain from all of the at least one of uplink communication or downlink communication with the UE for the first duration based on transmitting the silencing instruction.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
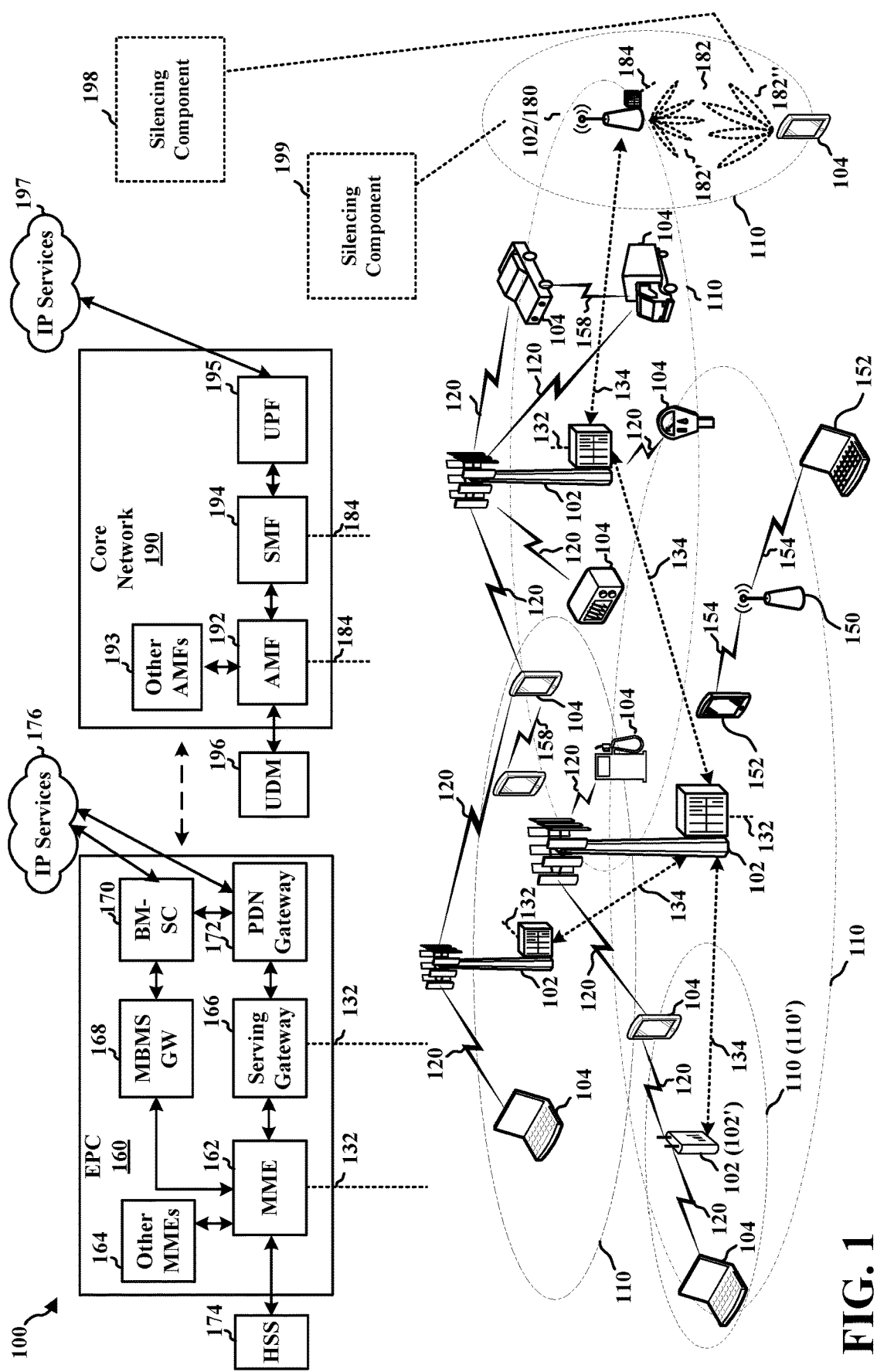
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to suspend communication with a base station 102/180 based on instructions from the base station 102/180. For example, the UE 104 may comprise a silencing component (198) configured to suspend communication with a base station 102/180 based on instructions from the base station 102/180. The UE 104 may receive, from a base station 102/180, a silencing instruction for at least one of uplink communication or downlink communication. The UE 104 may determine a first duration associated with the at least one of uplink communication or downlink communication based on the silencing instruction. The UE 104 may refrain from all of the at least one of uplink communication or downlink communication with the base station 102/180 for the first duration in response to receiving the silencing instruction.

Referring again to FIG. 1, in certain aspects, the base station 102/180 may be configured to configure a UE 104 to suspend communication for a duration based on channel quality. For example, the base station 102/180 may comprise a silencing component (199) configured to configure the UE 104 to suspend communication for the duration based on channel quality. The base station 102/180 may determine a first duration to suspend at least one of uplink communication or downlink communication with a UE 104. The base station 102/180 may transmit, to the UE 104, a silencing instruction for the at least one of uplink communication or downlink communication indicating the first duration. The base station 102/180 may refrain from all of the at least one of uplink communication or downlink communication with the UE 104 for the first duration based on transmitting the silencing instruction.

Although the following description may be focused on 5G NR, the concepts described herein may be applicable to other similar areas, such as LTE, LTE-A, CDMA, GSM, and other wireless/radio access technologies.

Figure 2:
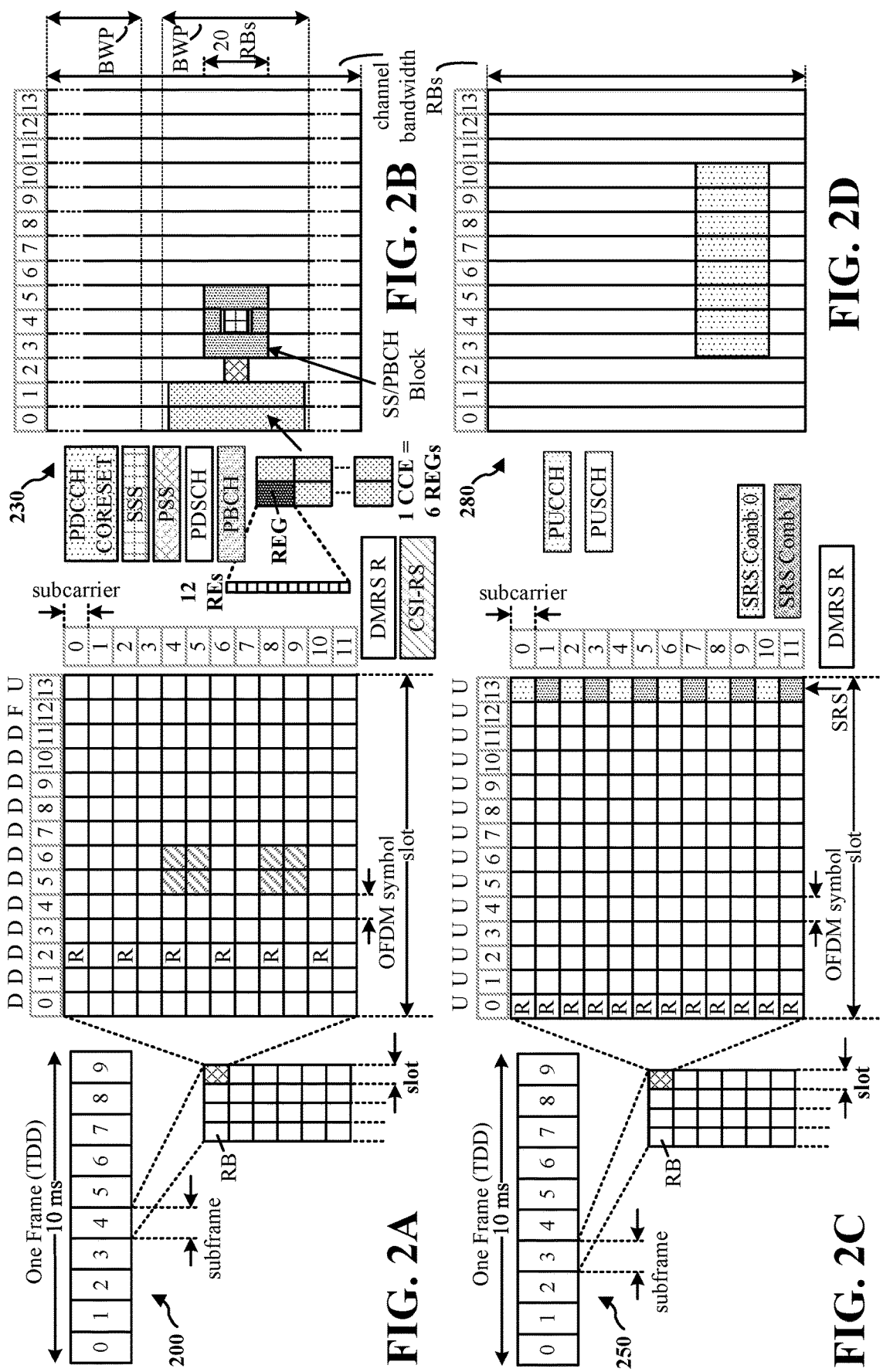
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
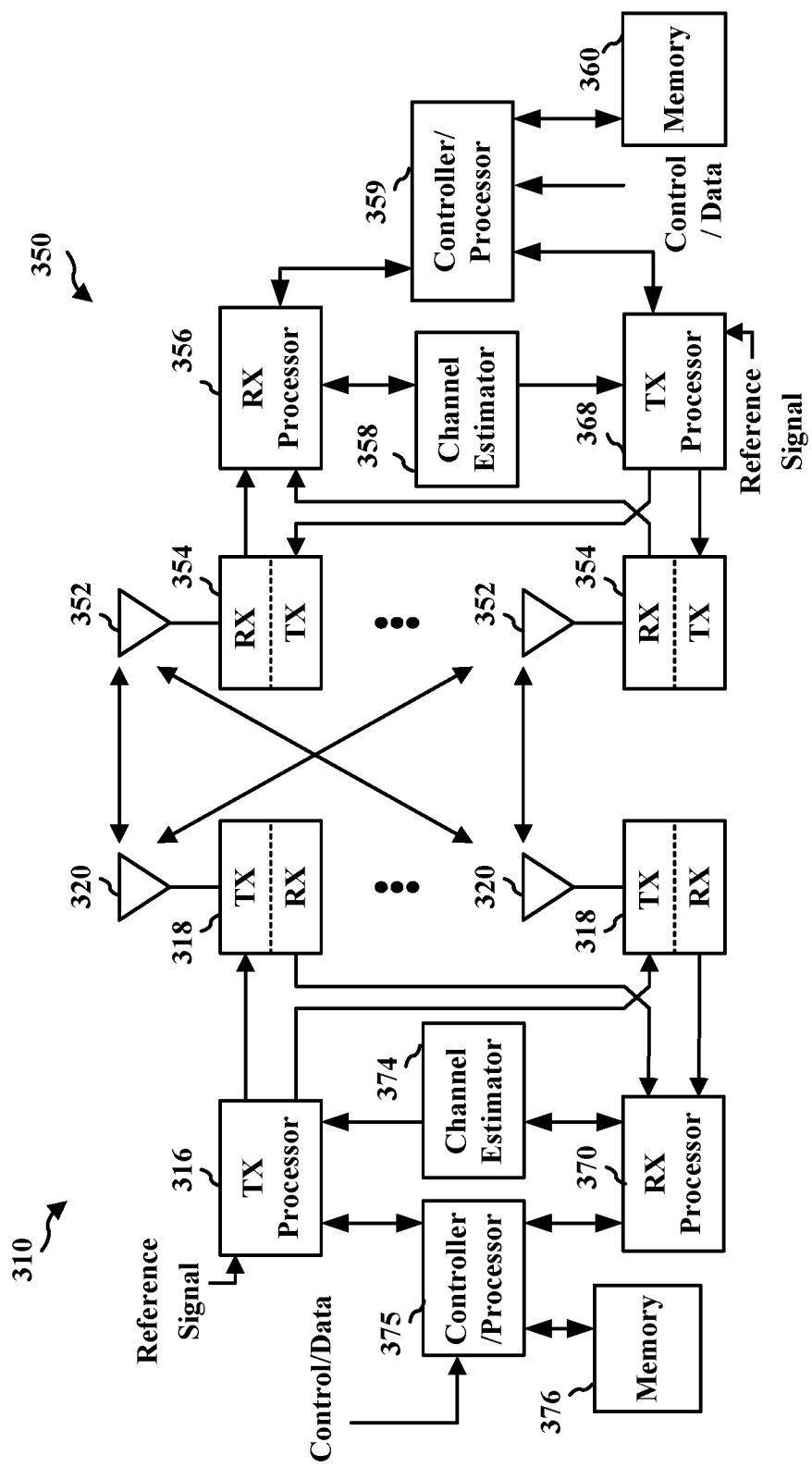
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some scenarios, a base station may determine that conditions on a channel on which the base station communicates with a UE have deteriorated to a point at which communication is appreciably affected. For example, the base station may determine that channel conditions have deteriorated if the base station receives a certain number of non-acknowledgement (NACK) feedback messages from the UE within a certain timeframe.

If channel conditions between a base station and a UE are relatively poor (e.g., such that multiple retransmissions are needed to each transmission), continuing to attempt communicate may be disadvantageous to both the base station and the UE. For example, continuing communication attempts may consume resources, such as power and/or processing resources. In addition, continuing communication attempts may introduce signaling overhead that negatively affects surrounding devices, such as other UEs and/or base stations, by causing interference and/or reducing the amount of available resources.

In view of the foregoing, a need exists for approaches to address scenarios in which a base station and a UE experience difficulty in communicating due to relatively poor channel conditions. FIGS. 4-8 describe various techniques and solutions for a base station and a UE if communication is adversely affected due to poor channel conditions. For example, in some aspects, a base station may determine to refrain from transmitting some periodic downlink data to a certain UE and/or refrain from receiving some periodic uplink data from that UE, such as when the base station determines that the channel conditions for the UE are relatively poor (e.g., after consecutively receiving a certain number of NACK feedback messages from the UE). Further aspects and examples are illustrated with respect to FIGS. 4-8.

Figure 4:
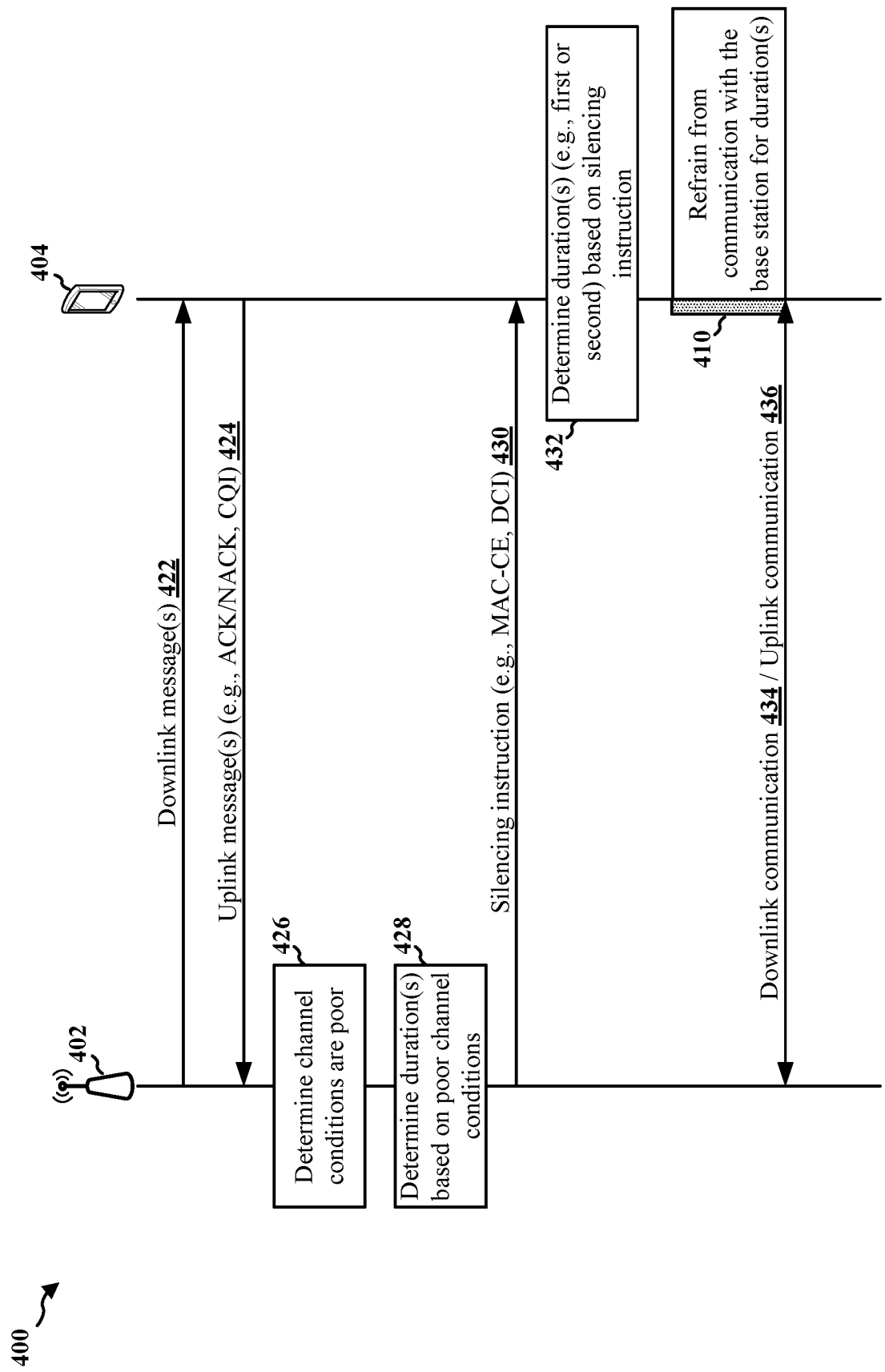
FIG. 4 is a call flow diagram illustrating example operations by a base station and a UE.

FIG. 4 is a call flow diagram 400 of signaling between a UE 404 and a base station 402. The base station 402 may be configured to provide at least one cell. The UE 404 may be configured to communicate with the base station 402. For example, in the context of FIG. 1, the base station 402 may correspond to base station 102/180 and, accordingly, the cell may include a geographic coverage area 110 in which communication coverage is provided and/or small cell 102' having a coverage area 110'. Further, a UE 404 may correspond to at least UE 104. In another example, in the context of FIG. 3, the base station 402 may correspond to base station 310 and the UE 402 may correspond to UE 350. Optional aspects are illustrated with a dashed line.

The base station 402 may be configured to transmit one or more downlink messages 422 to the UE 404. Each of the one or more downlink messages 422 may include downlink data and/or control information that may be separated over one or more messages and/or signaling, which the UE 404 may be scheduled to receive. In some aspects, the downlink messages 422 may include periodic and/or semi-periodic traffic, e.g., such that the one set of downlink messages 422 includes one occasion of periodic or semi-periodic traffic, another set of downlink messages 422 includes another occasion of periodic or semi-periodic traffic, and so forth. For example, the downlink messages 422 may include downlink data and/or control information configured according to semi-periodic scheduling (SPS).

In some aspects, the downlink messages 422 may include scheduling information for the UE 404, such as an uplink configured grant provided by RRC signaling (e.g., Type 1) and/or an uplink configured grant carried on a downlink control channel (e.g., Type 2), which may be activated or deactivated by the base station 402. Accordingly, one or more of the downlink messages 422 may allocate a set of resources on which the UE 404 may transmit without performing a scheduling request procedure, such as a set of resources on an uplink data channel (e.g., a PUSCH).

In some aspects, the UE 404 may be configured for HARQ feedback for the downlink messages 422. The base station 402 may expect either a corresponding ACK feedback message after each time the UE 404 successfully receives one of the downlink messages 422, or corresponding NACK feedback message after each time the UE 404 unsuccessfully receives one of the downlink messages 422. For example, the UE 404 may be configured to transmit an ACK/NACK feedback message in response to downlink periodic and/or semi-periodic traffic, such as but not limited to SPS traffic.

The UE 404 may be scheduled by the base station 402 to transmit one or more uplink messages 424 to the base station 402. In some aspects, one or more of the uplink messages 424 may include uplink data and/or control information. In some aspects, one or more of the uplink messages 424 may include either ACK feedback or NACK feedback corresponding to one of the downlink messages 422.

For example, the UE 404 may receive, or attempt to receive, each of the one or more downlink messages 422. If the UE 404 successfully receives one of the downlink messages 422, the UE 404 may transmit one of the uplink messages 424 that indicates a corresponding ACK feedback message. The UE 404 may successfully receive one of the downlink messages 422 if the UE 404 receives and decodes the one of the downlink messages 422, and the one of the downlink messages 422 passes any applicable decoding checks by the UE 404, such as cyclic redundancy check (CRC) and/or message integrity check (MIC).

In some instances, the UE 404 may transmit one of the uplink messages 424 that indicates a corresponding NACK feedback message if the UE 404 unsuccessfully receives one of the downlink messages 422. The UE 404 may unsuccessfully receive one of the downlink messages 422 if the UE 404 fails to receive a message that was scheduled to be received and/or if a message fails one or more applicable decoding checks by the UE 404, such as CRC and/or MIC.

In some aspects, the UE 404 may determine channel quality, such as by performing measurements based on signaling received from the base station 402 (e.g., reference signals that may be transmitted with one or more of the downlink messages 422). For example, the UE 404 may determine CQI. The UE 404 may transmit one or more of the uplink messages 424 to indicate the determined channel quality—e.g., the UE 404 may indicate CQI in one or more of the uplink messages 424.

Based on the one or more uplink messages 424, the base station 402 may determine, at 426, that the conditions on the channel or medium on which the base station 402 communicates with the UE 404 are poor. In some aspects, the base station 402 may determine 426 that the channel conditions are poor based on the base station 402 failing to successfully receive a certain number of uplink messages 424. For example, the base station 402 may compare a number of consecutive unsuccessfully received uplink messages (e.g., set of NACK feedback messages) 424 to a first threshold, and the base station 402 may determine, at 426, that the channel conditions are poor if the number of consecutive unsuccessfully received uplink messages (e.g., set of NACK feedback messages) 424 satisfies (e.g., meets or exceeds) the first threshold.

In some aspects, the base station 402 may determine, at 426, that the channel conditions are poor based on one or more of the uplink messages 424 that indicate NACK feedback. For example, the base station 402 may compare a number of consecutively received uplink messages 424 indicating NACK feedback to a second threshold. The base station 402 may determine, at 426, that the channel conditions are poor if the number of consecutively received uplink messages 424 indicating NACK feedback satisfies (e.g., meets or exceeds) the second threshold.

In some aspects, the base station 402 may determine, at 426, that the channel conditions are poor based on one or more of the uplink messages 424 that indicate channel quality determined by the UE 404. For example, one or more of the uplink messages 424 may indicate a CQI, and the base station 402 may determine, at 426, that the channel conditions are poor based on the channel quality (e.g., CQI) indicated by the UE 404.

In some aspects, if the base station 402 determines, at 426, that the channel conditions are poor, the base station 402 may determine that communication with the UE 404 should be suspended, e.g., for a certain duration after which channel conditions may have improved and communication may resume. In some aspects, the base station 402 may determine that communication with the UE 404 should be suspended based on another condition (e.g., other than the channel conditions being poor). For example, the base station 402 may determine that one or more transmission occasions of periodic and/or semi-periodic traffic should be skipped, and therefore, communication with the UE 404 should be suspended. By way of illustration, the base station 402 may determine that the base station 402 has no data to transmit to the UE 404 in the next one or more SPS occasions; however, the UE 404 may still transmit NACK feedback associated with the next one or more SPS occasions because the UE 404 unexpectedly would not receive SPS data in the next one or more SPS occasions. Therefore, the base station 402 may determine that communication with the UE 404 should be suspended while the base station 402 skips the next one or more SPS occasions, which potentially may conserve power at the UE 404. In some instances, the base station 402 may be configured to deactivate and reactive SPS via RRC signaling. However, in some instances, such as low-latency applications including but not limited to URLLC or industrial IOT, RRC signaling may not meet stringent latency requirements of low-latency applications. As such, the disclosure proposes utilizing a DCI or MAC-CE based approach, discussed herein, that meets the stringent latency requirements for low-latency applications.

If the base station 402 determines that communication with the UE 404 should be suspended (e.g., due to poor channel conditions, due to skipping occasions for transmitting data and/or control information, due to another reason), the base station 402 may determine, at 428, at least one duration. In some aspects, the base station 402 may determine, at 428, the duration as at least one of a quantized value, a number of milliseconds, a number of slots, a number of subframes, a number of cycles associated with periodic traffic, a number of cycles associated with SPS traffic, or a configured grant. In some aspects, the quantized value may comprise an assigned time duration may be provided by an index, and may have a reduced granularity (e.g., may be linear or exponentially increasing time line).

For example, the base station 402 may be configured with and/or may tabulate a set of values for the duration (e.g., the base station 402 may include a table with the set of values stored in memory). The base station 402 may determine the duration based on the number of consecutive unsuccessfully received uplink messages 424 and/or the number of consecutive uplink messages 424 indicating NACK feedback, such as by identifying a value that corresponds to the number of consecutive unsuccessfully received uplink messages 424 and/or the number of consecutive uplink messages 424 indicating NACK feedback.

In some aspects, each value in the set of values may have a corresponding index, which may be preconfigured or may be assigned by the base station 402. The UE 404 may have stored in memory information indicating each of the set of values and the respective corresponding index. For example, the UE 404 may be preconfigured with such information or the base station 402 may transmit such information to the UE 404 before the channel conditions deteriorate.

In some aspects, if the channel conditions are poor, the base station 402 may determine to suspend uplink and downlink communication with the UE 404. For example, the suspension of communication may include suspension of both downlink periodic and/or semi-periodic traffic (e.g., SPS traffic) to the UE 404 and uplink ACK/NACK feedback from the UE responsive to the downlink periodic and/or semi-periodic traffic. In some aspects, the suspension of communication may include suspension traffic for an uplink configured grant (e.g., Type 1 and Type 2)—that is, the UE 404 may have been allocated resources for uplink communication by a configured grant, but the base station 402 may determine that such traffic should be suspended even though resources have already been allocated. The suspension of communication may further include all other types of uplink communication and/or downlink communication.

The suspension of communication by may temporary, and therefore, the base station 402 may determine the duration for the suspension of communication. In some aspects, the base station 402 may determine, at 428, a duration for the suspension of communication. The base station 428 may determine a duration for the suspension of communication that includes a first duration for uplink communication and a second duration for downlink communication. As the base station 402 may suspend both uplink and downlink communication, the first duration and the second duration may be the same duration. For example, the first duration and the second duration may refer to the same element (e.g., a timer or other timing element).

In order to inform the UE 404 of the suspension of the uplink and/or downlink communication, the base station 402 may generate a silencing instruction 430. In some aspects, the base station 402 may generate the silencing instruction 430 as a set of bits in a MAC control element (CE) (MAC-CE) and/or DCI. For example, the base station 402 may insert one or more bits for an index corresponding to the duration of the suspension of communication in at least one of the MAC-CE and/or the DCI. In some aspects, the one or more bits may correspond to the duration for which both uplink and downlink communication are to be suspended. In some aspects, the base station 402 may insert one or more bits for an index corresponding to the first duration for suspension of uplink communication and one or more bits corresponding to the second duration for suspension of downlink communication, e.g., in the same or another MAC-CE and/or DCI indicating suspension of downlink communication.

In some aspects, the base station 402 may generate the silencing instruction 430 as data and/or control information in a message or other signaling. For example, the base station 402 may include a quantized value, such as a number of slots or a number of cycles for periodic traffic, in a message that indicates suspension of one or both of uplink and/or downlink communication. If the base station 402 determines that both uplink and downlink communication should be suspended, the base station 402 may generate one silencing instruction to indicate the duration for suspension of uplink and downlink communication. The base station may generate a silencing instruction to indicate a first duration for suspension of uplink communication and a second duration for suspension of downlink communication. As the first and second durations may refer to the same element for suspension of both uplink and downlink communication, the silencing instruction may indicate one duration (e.g., that is both the first duration and the second duration), which may correspond to one element, such as a timer configured at the UE 404 for which to suspend communication.

The base station 402 may then transmit the silencing instruction 430 to the UE 404. The UE 404 may receive the silencing instruction 430. The UE 404 may determine, at 432, the duration indicating uplink and downlink communication with the base station 402 should be suspended. In some aspects, the UE 404 may determine a first duration corresponding to suspension of uplink communication and a second duration corresponding to suspension of downlink communication, based on the silencing instruction 430. For example, the UE 404 may identify the one or more bits in a MAC-CE and/or DCI for an index corresponding to the duration indicating uplink and downlink communication should be suspended. The UE 404 may use an index to identify a corresponding value, such as in a table (e.g., a lookup table) or other relational data structure. In some aspects, the UE 404 may identify at least one quantized value in a message or other signaling that indicates uplink and downlink communication with the base station 402 should be suspended.

In response to receiving the silencing instruction 430, the UE 404, in some aspects, may refrain from all uplink communication and/or downlink communication for the indicated duration 410. For example, the UE 404 may set a countdown timer to the duration 410 in response to receiving the silencing instruction 430. The UE 404 may configure the countdown timer with a stored value corresponding to an index indicated by the silencing instruction 430. In some aspects, the UE 404 may set another timer for the other of uplink or downlink communication if the base station 402 separately suspends uplink and downlink communication.

In some aspects, such as refraining from all uplink and/or downlink communication for the duration 410, the UE 404 may refrain from transmitting any uplink transmission to the base station 402, including data and/or control information according to an uplink configured grant. The UE may also refrain from transmitting any ACK/NACK feedback responsive to any downlink communication (e.g., if only uplink communication is suspended, and downlink communication is unsuspended). In refraining from all downlink communication for the duration 410, the UE 404 may refrain from receiving (e.g., detecting for, decoding, etc.) downlink SPS communication, as all as any other downlink periodic communication. In some aspects, data may be delayed at the UE 404 during the refrained transmission. For example, the base station 402 may suspend data transmission and/or reception to and/or from the UE 404 for a given time duration. In some instances, the base station 402 may determine that data transmitted from the UE 404 may not be received successfully (e.g., due to bad channel conditions, etc.), such that the base station 402 suspends transmission/reception.

In some aspects, the silencing instruction 430 may be applied regardless of any discontinuous reception (DRX) configuration of the UE 404 and/or any discontinuous transmission (DTX) configuration of the UE 404. For example, DRX/DTX configurations may not affect uplink communication transmitted according to uplink configured grants (both type 1 and type 2 uplink configured grants) and/or ACK/NACK feedback. The UE 404 may refrain from uplink communication scheduled by type 1 or type 2 uplink configured grant and uplink communication for ACK/NACK feedback in response to receiving a silencing instruction 430 indicating suspension of uplink communication for the duration 410. In some aspects, DRX/DTX configurations may not affect (or may be scheduled with "awake" cycles consistent with) downlink SPS or periodic traffic. The UE 404 may refrain from receiving downlink SPS traffic and periodic traffic in response to receiving a silencing instruction 430 indicating suspension of downlink communication for the duration 410.

In some aspects, the UE 404 may conserve power due to the silencing instruction 430. The UE 404 may transition from a relatively higher power state or "awake" state (e.g., in which the UE 404 may transmit and receive) to a relatively lower power state or "sleep" state (e.g., in which the UE 404 neither transmits nor receives) for at least a portion of the duration 410.

The UE 404 may resume downlink communication 434 and uplink communication 436 upon expiration of the duration 410, such as when a countdown timer configured by the UE 404 expires. If suspension of uplink communication and suspension of downlink communication are separately configured, the UE 404 may resume uplink communication 436 upon expiration of the first duration and may resume downlink communication 434 upon expiration of the second duration. In some aspects, the UE 404 may transition from the relatively lower power state to the relatively higher power state upon expiration of the duration 410.

The base station 402 may correspondingly refrain from receiving uplink communication from and/or transmitting downlink communication to the UE 404 during the duration 410. The base station 402 may reduce over-the-air signaling, which may cause unintended interference to other devices, and/or may increase the amount of resources available for communication with other UEs. The base station 402 may resume receiving uplink communication 436 and transmitting downlink communication 434 upon expiration of the duration 410, e.g., based on the silencing instruction 430. If suspension of uplink communication and suspension of downlink communication are separately configured, the base station 402 may resume uplink communication 436 upon expiration of the first duration and may resume downlink communication 434 upon expiration of the second duration.

Figure 5:
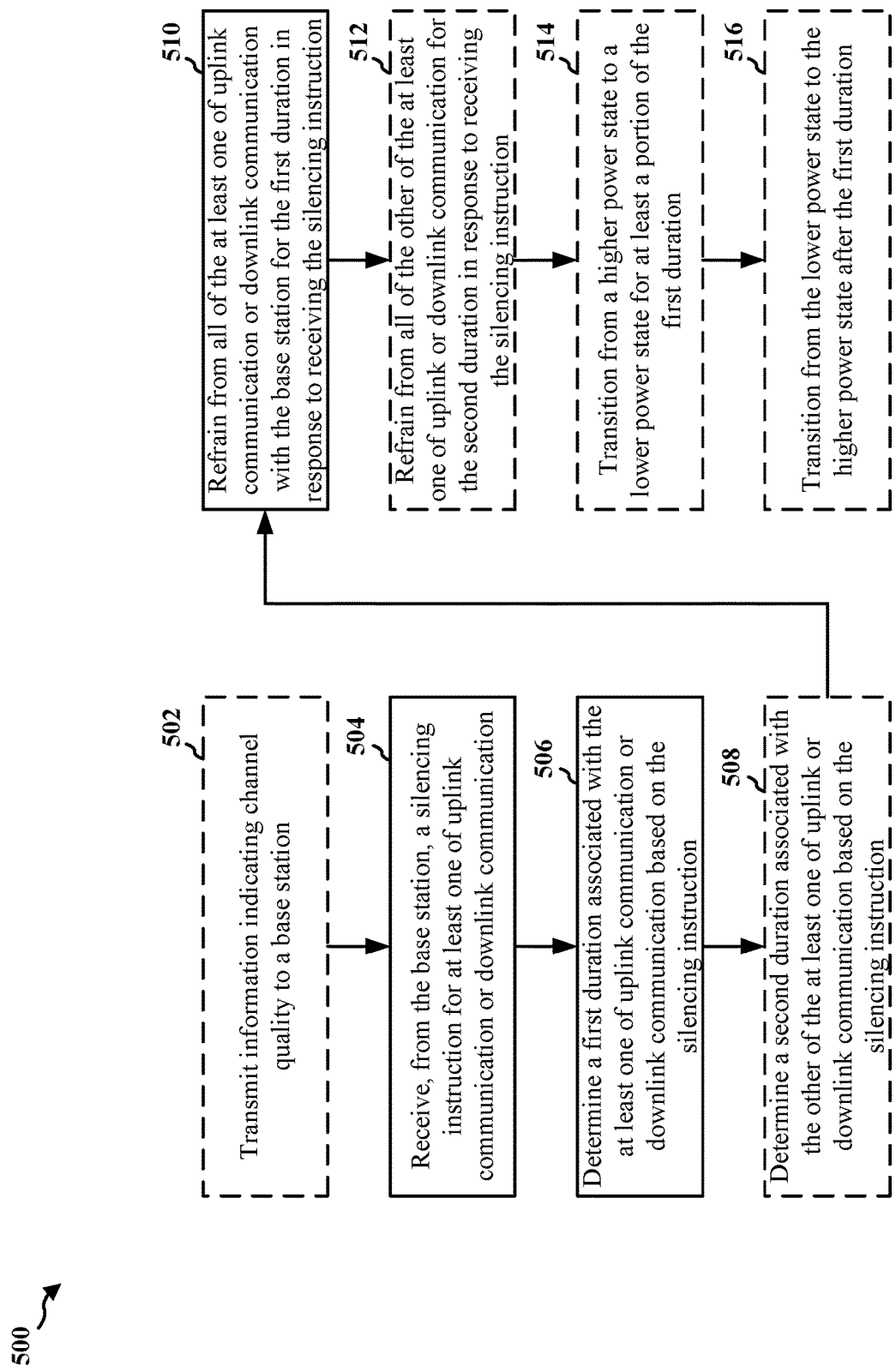
FIG. 5 is a flowchart of a method of wireless communication.

FIG. 5 is a flowchart 500 of a method of wireless communication. The method may be performed by a UE or a component of a UE (e.g., the UE 104, 404; the apparatus 602; the cellular baseband processor 604, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to suspend communication with a base station based on instructions from the base station.

In some aspects, for example at 502, the UE may transmit information indicating a channel quality to a base station. For example, 502 may be performed by channel quality component 640 of apparatus 602. In some aspects, the UE may transmit a set of NACK feedback messages to the base station. The information indicating the channel quality may comprise the set of NACK feedback messages. The set of NACK feedback messages may implicitly indicate to the base station that the channel quality is poor. In some aspects, the information may include a CQI that may be determined by the UE. In the context of FIG. 4, the UE 404 may transmit the one or more uplink messages 424 to the base station 402, and one or more of the uplink messages 424 may indicate NACK feedback and/or may indicate CQI.

At 504, the UE may receive a silencing instruction for at least one of uplink communication and/or downlink communication. For example, 504 may be performed by silencing component 642 of apparatus 602. The UE may receive the silencing instruction from the base station. In some aspects, the silencing instruction may be received based on the information indicating the channel quality that is transmitted to the base station. In some aspects, the silencing instruction may be received based on one or more periodic or semi-periodic occasions associated with reception of at least one of data or control information that are to be skipped by the base station. In some aspects, the silencing instruction may be applicable to both uplink and downlink communication. The silencing instruction may be included in a MAC CE and/or a DCI message. For example, the silencing instruction may comprise an index in the MAC CE and/or DCI message. In some aspects, the silencing instruction may be applied regardless of at least one of a DRX cycle and/or a DTX cycle configured for the UE. In the context of FIG. 4, the UE 404 may receive, from the base station 402, the silencing instruction 430 for at least one of uplink communication or downlink communication.

At 506, the UE may determine a first duration associated with the at least one of uplink communication and/or downlink communication. For example, 506 may be performed by duration component 644 of apparatus 602. The UE may determine the first duration associated with the at least one of uplink and/or downlink communication based on the silencing instruction. For example, the first duration may be determined based on a preconfigured timer value that corresponds to the index indicated in the MAC CE and/or the DCI message. In some aspects, the first duration may comprise at least one of a quantized value, a number of milliseconds, a number of slots, a number of subframes, a number of cycles associated with periodic traffic, a number of cycles associated with SPS traffic, and/or a configured grant. In the context of FIG. 4, the UE 404 may determine 432 the duration(s) based on receiving the silencing instruction 430.

In some aspects, for example at 508, the UE may determine a second duration associated with the other of the at least one of uplink communication and/or downlink communication. For example, 508 may be performed by duration component 644 of apparatus 602. The UE may determine the second duration associated with the other of the at least one of uplink communication and/or downlink communication based on the silencing instruction. In some aspects, the second duration may be determined based on a preconfigured timer value that corresponds to the index indicated in the MAC CE and/or the DCI message. In some aspects, the first and second durations may be the same. For example, the first and second durations may be indicated as a single duration in the silencing instruction, and may correspond to the same element, such as the same timer at the UE. In the context of FIG. 4, the UE 404 may determine 432 the duration(s) based on receiving the silencing instruction 430.

At 510, the UE may refrain from all of the at least one of uplink communication and/or downlink communication with the base station for the first duration. For example, 510 may be performed by refrain component 646 of apparatus 602. The UE may refrain from all of the at least one of uplink communication and/or downlink communication with the base station for the first duration in response to receiving the silencing instruction. In some aspects, the refraining from all of the at least one of uplink communication and/or downlink communication may comprise refraining from all of both the uplink communication and the downlink communication with the base station for the first duration in response to receiving the silencing instruction. In some aspects, the one of uplink communication or downlink communication may include at least one of SPS traffic, an uplink configured grant, ACK feedback, and/or NACK feedback. In the context of FIG. 4, the UE 404 may refrain from all uplink communication with the base station 402 for the first duration 410.

In some aspects, for example at 512, the UE may refrain from all of the other of the at least one of uplink communication and/or downlink communication with the base station for the second duration. For example, 512 may be performed by refrain component 646 of apparatus 602. The UE may refrain from all of the other of the at least one of uplink communication and/or downlink communication with the base station for the second duration in response to receiving the silencing instruction. In the context of FIG. 4, the UE 404 may refrain from all downlink communication with the base station 402 for the duration 410.

In some aspects, for example at 514, the UE may transition from a higher power state to a lower power state. For example, 514 may be performed by transition component 648 of apparatus 602. The UE may transition from the higher power state to the lower power state for at least a portion of the first duration. Transitioning to the lower power state (e.g., sleep state) from the higher power state (e.g., awake state) allows the UE to conserve power due to the silencing instruction at least during the duration indicated in the silencing instructions. In the context of FIG. 4, the UE 404 may transition from a higher power state to a lower power state for at least a portion of the first duration 410.

In some aspects, for example at 516, the UE may transition from the lower power state to the higher power state. For example, 516 may be performed by transition component 648 of apparatus 602. The UE may transition from the lower power state to the higher power state after the first duration. For example, the UE may transition to the higher power state, form the lower power state, at the expiration of the first duration, such that the UE may resume communication with the base station. In the context of FIG. 4, the UE 404 may transition from the lower power state to the higher power state after the first duration 410.

Figure 6:
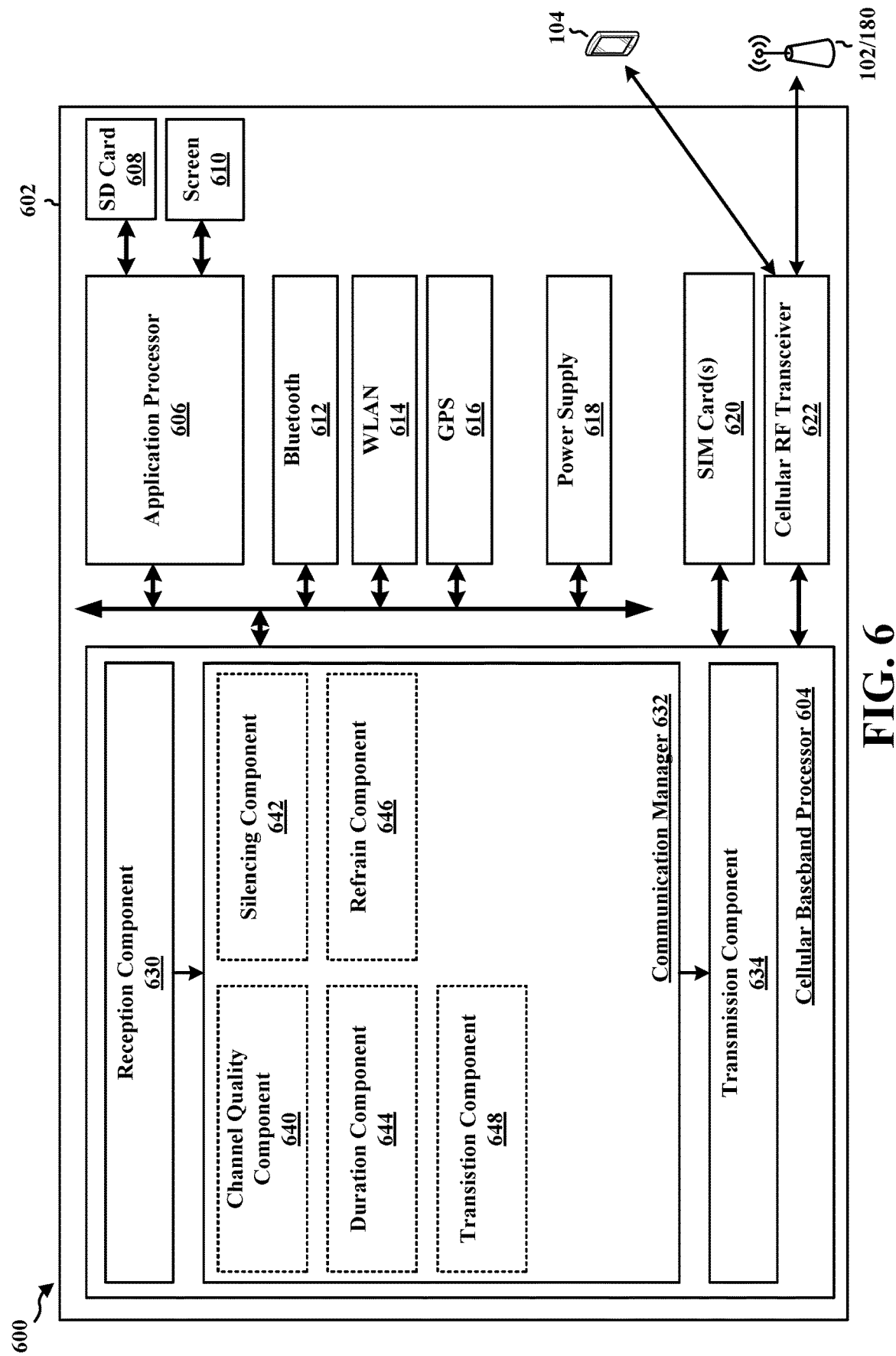
FIG. 6 is a diagram illustrating an example of a hardware implementation for an example apparatus.

FIG. 6 is a diagram 600 illustrating an example of a hardware implementation for an apparatus 602. The apparatus 602 is a UE and includes a cellular baseband processor 604 (also referred to as a modem) coupled to a cellular RF transceiver 622 and one or more subscriber identity modules (SIM) cards 620, an application processor 606 coupled to a secure digital (SD) card 608 and a screen 610, a Bluetooth module 612, a wireless local area network (WLAN) module 614, a Global Positioning System (GPS) module 616, and a power supply 618. The cellular baseband processor 604 communicates through the cellular RF transceiver 622 with the UE 104 and/or BS 102/180. The cellular baseband processor 604 may include a computer-readable medium/memory. The computer-readable medium/memory may be non-transitory. The cellular baseband processor 604 is responsible for general processing, including the execution of software stored on the computer-readable medium/memory. The software, when executed by the cellular baseband processor 604, causes the cellular baseband processor 604 to perform the various functions described supra. The computer-readable medium/memory may also be used for storing data that is manipulated by the cellular baseband processor 604 when executing software. The cellular baseband processor 604 further includes a reception component 630, a communication manager 632, and a transmission component 634. The communication manager 632 includes the one or more illustrated components. The components within the communication manager 632 may be stored in the computer-readable medium/memory and/or configured as hardware within the cellular baseband processor 604. The cellular baseband processor 604 may be a component of the UE 350 and may include the memory 360 and/or at least one of the TX processor 368, the RX processor 356, and the controller/processor 359. In one configuration, the apparatus 602 may be a modem chip and include just the cellular baseband processor 604, and in another configuration, the apparatus 602 may be the entire UE (e.g., see 350 of FIG. 3) and include the aforediscussed additional modules of the apparatus 602.

The communication manager 632 includes a channel quality component 640 that is configured to transmit information indicating a channel quality to a base station, e.g., as described in connection with 502 of FIG. 5. The communication manager 632 further includes a silencing component 642 that is configured to receive a silencing instruction for at least one of uplink communication and/or downlink communication, e.g., as described in connection with 504 of FIG. 5. The communication manager 632 further includes a duration component 644 that is configured to determine a first duration associated with the at least one of uplink communication and/or downlink communication, e.g., as described in connection with 506 of FIG. 5. The duration component 644 may be configured to determine a second duration associated with the other of the at least one of uplink communication and/or downlink communication, e.g., as described in connection with 508 of FIG. 5. The communication manager 632 further includes a refrain component 646 that is configured to refrain from all of the at least one of uplink communication and/or downlink communication with the base station for the first duration, e.g., as described in connection with 510 of FIG. 5. The refrain component 646 may be configured to refrain from all of the other of the at least one of uplink communication and/or downlink communication with the base station for the second duration, e.g., as described in connection with 512 of FIG. 5. the communication manager 632 further includes a transition component 648 that is configured to transition from a higher power state to a lower power state, e.g., as described in connection with 514 of FIG. 5. The transition component 648 may be configured to transition from the lower power state to the higher power state, e.g., as described in connection with 516 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the cellular baseband processor 604, includes means for receiving, from a base station, a silencing instruction for at least one of uplink communication or downlink communication. The apparatus includes means for determining a first duration associated with the at least one of uplink communication or downlink communication based on the silencing instruction. The apparatus includes means for refraining from all of the at least one of uplink communication or downlink communication with the base station for the first duration in response to receiving the silencing instruction. The means for refraining from all of the at least one of uplink communication or downlink communication may be configured to refrain from all of both the uplink communication and the downlink communication with the base station for the first duration in response to receiving the silencing instruction. The apparatus further includes means for determining a second duration associated with the other of the at least one of uplink communication or downlink communication based on the silencing instruction. The apparatus further includes means for refraining from all of the other of the at least one of uplink communication or downlink communication with the base station for the second duration in response to receiving the silencing instruction. The apparatus further includes means for transitioning from a higher power state to a lower power state for at least a portion of the first duration. The apparatus further includes means for transitioning from the lower power state to the higher power state after the first duration. The apparatus further includes means for transmitting a set of NACK feedback messages to the base station. The silencing instructions is received based on the set of NACK feedback messages. The aforementioned means may be one or more of the aforementioned components of the apparatus 602 configured to perform the functions recited by the aforementioned means. As described supra, the apparatus 602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 7:
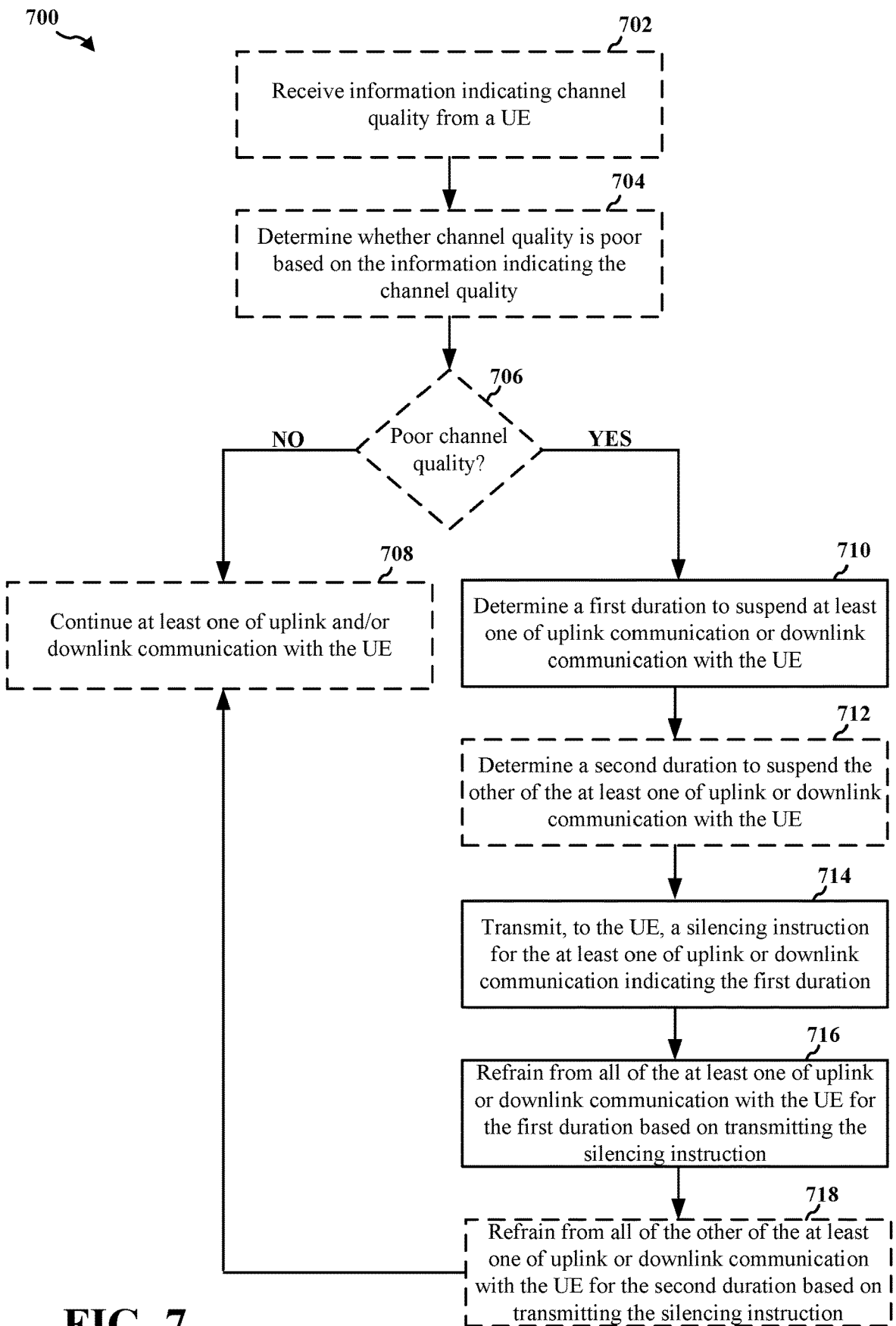
FIG. 7 is a flowchart of a method of wireless communication.

FIG. 7 is a flowchart 700 of a method of wireless communication. The method may be performed by a base station or a component of a base station (e.g., the base station 102/180, 402; the apparatus 802; the baseband unit 804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to configure a UE to suspend communication for a duration based on channel quality.

In some aspects, for example at 702, the base station may receive information indicating a channel quality from a UE. For example, 702 may be performed by channel quality component 840 of apparatus 802. In some aspects, the base station may receive a set of NACK feedback message from a UE. The information indicating the channel quality may comprise the set of NACK feedback messages. The set of NACK feedback messages may implicitly indicate that the channel quality is poor. In some aspects, the base station may receive a message indicating CQI from the UE. In the context of FIG. 4, the base station 402 may receive the one or more uplink messages 424 from UE 404, and one or more of the uplink messages 424 may indicate NACK feedback and/or may indicate CQI.

In some aspects, for example at 704, the base station may determine whether the channel quality is poor. For example, 704 may be performed by determination component 842 of apparatus 802. The base station may determine whether the channel quality is poor based on the information indicating the channel quality. In some aspects, the base station may compare a number of the set of NACK feedback messages to a threshold. The base station may determine whether the number of the set of NACK feedback messages satisfies the threshold, which may indicate the channel quality is poor. In some aspects, the base station may determine whether the CQI, received from the UE, indicates the channel quality is poor. In the context of FIG. 4, the base station 402 may determine whether the channel quality is poor based on CQI received from the UE 404 and/or based on comparison of a number of the one or more consecutive uplink messages 424 indicating NACK feedback to the second threshold.

In some aspects, for example at 706, if the base station determines that the channel quality is not poor (e.g., if number of the one or more consecutive uplink messages indicating NACK feedback fails to satisfy the threshold or if the CQI does not satisfy a CQI threshold) and/or if one or more periodic or semi-periodic occasions associated with transmission of at least one of data or control information to the UE are not to be skipped, then at 708, the base station may continue at least one of uplink and/or downlink communication with the UE. For example, 706 may be performed by determination component 842 of apparatus 802. In the context of FIG. 4, the base station 402 may continue downlink communication 434 and/or uplink communication 436 with the UE 404.

In some aspects, if the base station, at 706, determines that the channel quality is poor (e.g., if number of the one or more consecutive uplink messages 424 indicating NACK feedback satisfies the threshold and/or if the CQI does satisfy the CQI threshold) and/or if one or more periodic or semi-periodic occasions associated with transmission of at least one of data or control information to the UE are to be skipped, then at 710, the base station may determine a first duration to suspend at least one of uplink communication and/or downlink communication with the UE. For example, 710 may be performed by duration component 844 of apparatus 802. The first duration may include at least one of a quantized value, a number of milliseconds, a number of slots, a number of subframes, a number of cycles associated with periodic traffic, a number of cycles associated with SPS traffic, and/or a configured grant. In the context of FIG. 4, the base station 402 may determine the duration(s) 428 based on the poor channel conditions.

In some aspects, for example at 712, the base station may determine a second duration to suspend the other of the at least one of uplink communication and/or downlink communication with the UE. For example, 706 may be performed by duration component 844 of apparatus 802. In some aspects, the first and second durations may be the same. For example, the first and second durations may be indicated as a single duration, and may correspond to the same element, such as the same timer at the UE. In the context of FIG. 4, the base station 402 may determine the duration(s) 428 based on the poor channel conditions.

At 714, the base station may transmit a silencing instruction for the at least one of uplink communication or downlink communication. For example, 714 may be performed by silencing component 846 of apparatus 802. The base station may transmit the silencing instruction to the UE. The base station may transmit, to the UE, the silencing instruction for the at least one of uplink communication or downlink communication indicating the first duration. The silencing instruction may be configured to cause the UE to transition from a higher power state to a lower power state for at least a portion of the first duration, and to transition from the lower power state to the higher power state after the first duration. In some aspects, the silencing instruction may be applicable to both uplink and downlink communication. In some aspects, the silencing instruction may further indicate the second duration. The silencing instruction may be included in a MAC CE and/or a DCI message. For example, the silencing instruction may be an index in the MAC CE and/or DCI message. The index may correspond to a preconfigured timer value at the UE. In some aspects, the silencing instruction may be applied regardless of at least one of a DRX cycle and/or a DTX cycle configured for the UE. In some aspects, the silencing instructions may be transmitted based on one or more periodic or semi-periodic occasions associated with transmission of at least one of data or control information to the UE that are to be skipped. In some aspects, the silencing instructions may be transmitted if the number of the set of NACK feedback messages satisfies a threshold. In the context of FIG. 4, the base station 402 may transmit, to the UE 404, the silencing instruction 430 for at least one of uplink communication and/or downlink communication.

At 716, the base station may refrain from all of the at least one of uplink communication and/or downlink communication with the UE. For example, 716 may be performed by refrain component 848 of apparatus 802. The base station may refrain from all of the at least one of uplink communication and/or downlink communication with the UE for the first duration based on transmitting the silencing instruction. In some aspects, the refraining from all of the at least one of uplink communication or downlink communication with the UE may comprise refraining from all of both the uplink communication and the downlink communication with the UE for the first duration based on transmitting the silencing instruction. In some aspects, the at least one of uplink communication or downlink communication may include at least one of SPS traffic, an uplink configured grant, ACK feedback, and/or NACK feedback. In the context of FIG. 4, the base station 402 may refrain from all uplink communication with the UE 404 for the first duration 410.

At 718, the base station may refrain from all of the other of the at least one of uplink communication and/or downlink communication with the UE. For example, 718 may be performed by refrain component 848 of apparatus 802. The base station may refrain from all of the other of the at least one of uplink communication and/or downlink communication with the UE for the second duration based on transmitting the silencing instruction. In some aspects, the first and second durations may be the same. For example, the first and second durations may be indicated as a single duration in the silencing instruction, and may correspond to the same element, such as the same timer. The base station may resume communication with the UE upon the expiration of the second duration. In the context of FIG. 4, the base station 402 may refrain from all downlink communication with the UE 404 for the duration 410, and may resume communication 434, 436 with the UE upon the expiration of the duration 410.

Figure 8:
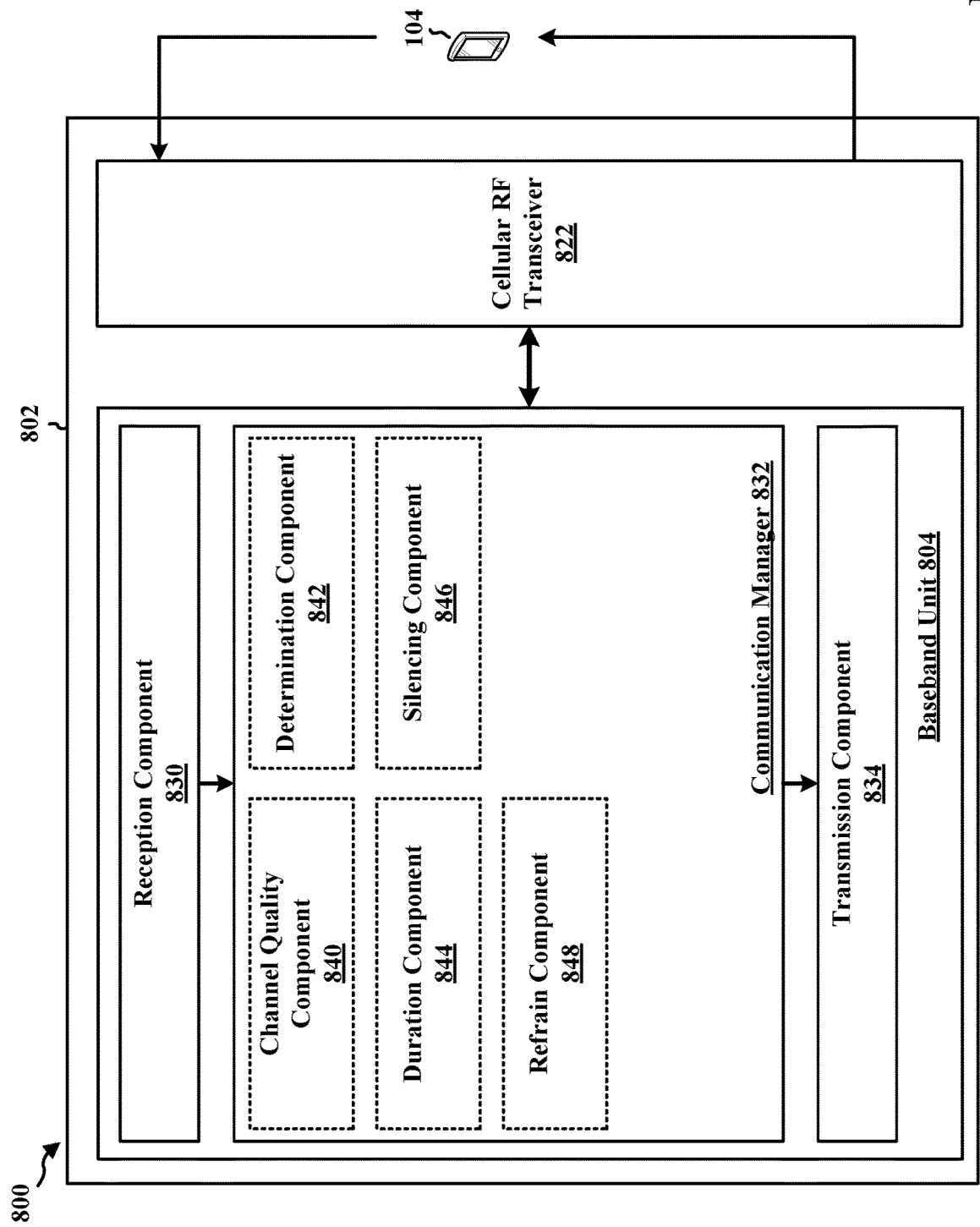
FIG. 8 is a diagram illustrating an example of a hardware implementation for an example apparatus.

FIG. 8 is a diagram 800 illustrating an example of a hardware implementation for an apparatus 802. The apparatus 802 is a BS and includes a baseband unit 804. The baseband unit 804 may communicate through a cellular RF transceiver 822 with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes a channel quality component 840 that may receive information indicating a channel quality from a UE, e.g., as described in connection with 702 of FIG. 7. The communication manager 832 further includes a determination component 842 that may determine whether the channel quality is poor, e.g., as described in connection with 704 of FIG. 7. The determination component 842 may be configured to determine that the channel quality is poor or not poor, e.g., as described in connection with 706 of FIG. 6. The communication manager 832 further includes a duration component 844 that may determine a first duration to suspend at least one of uplink communication and/or downlink communication with the UE, e.g., as described in connection with 710 of FIG. 7. The duration component 844 may be configured to determine a second duration to suspend the other of the at least one of uplink communication and/or downlink communication with the UE, e.g., as described in connection with 712 of FIG. 7. The communication manager 832 further includes a silencing component 846 that may transmit a silencing instruction for the at least one of uplink communication or downlink communication, e.g., as described in connection with 714 of FIG. 7. The communication manager 832 further includes a refrain component 848 that may refrain from all of the at least one of uplink communication and/or downlink communication with the UE, e.g., as described in connection with 716 of FIG. 7. The refrain component 848 may be configured to refrain from all of the other of the at least one of uplink communication and/or downlink communication with the UE, e.g., as described in connection with 718 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for determining a first duration to suspend at least one of uplink communication or downlink communication with a UE. The apparatus includes means for transmitting, to the UE, a silencing instruction for the at least one of uplink communication or downlink communication indicating the first duration. The apparatus includes means for refraining from all of the at least one of uplink communication or downlink communication with the UE for the first duration based on transmitting the silencing instruction. The means for refraining from all of the at least one of uplink communication or downlink communication with the UE is configured to refrain from all of both the uplink communication and the downlink communication with the UE for the first duration based on transmitting the silencing instruction. The apparatus further includes means for determining a second duration to suspend the other of the at least one of uplink communication or downlink communication. The silencing instruction further indicates the second duration. The apparatus further includes means for refraining from all of the other of the at least one of uplink communication or downlink communication with the UE for the second duration based on transmitting the silencing instruction. The apparatus further includes means for receiving a set of NACK feedback messages from the UE. The apparatus further includes means for comparing a number of the set of NACK feedback messages to a threshold. The silencing instruction is transmitted when the number of the set of NACK feedback messages satisfies the threshold. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure describes various techniques and solutions for a base station and a UE if communication is adversely affected due to poor channel conditions. For example, in some aspects, a base station may determine to refrain from transmitting some periodic downlink data to a certain UE and/or refrain from receiving some periodic uplink data from that UE, such as if the base station determines that the channel conditions for the UE are poor (e.g., after consecutively receiving a certain number of NACK feedback messages from the UE). At least one advantage of the disclosure is that the base station may reduce over-the-air signaling by suspending communication with the UE, which may reduce unintended interference to other device, as well as increase the amount of resources available for communication with other UEs. At least another advantage of the disclosure is that the UE may enter into a reduced power state while communication between the UE and base station is suspended, which may assist in prolonging battery life of the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising receiving, from a base station, a silencing instruction for at least one of uplink communication or downlink communication; determining a first duration associated with the at least one of uplink communication or downlink communication based on the silencing instruction; and refraining from all of the at least one of uplink communication or downlink communication with the base station for the first duration in response to receiving the silencing instruction.

In Aspect 2, the method of Aspect 1 further includes that the silencing instruction is for both the uplink communication and the downlink communication, and the refraining from all of the at least one of uplink communication or downlink communication further includes refraining from all of both the uplink communication and the downlink communication with the base station for the first duration in response to receiving the silencing instruction.

In Aspect 3, the method of Aspect 1 or 2 further includes determining a second duration associated with the other of the at least one of uplink communication or downlink communication based on the silencing instruction; and refraining from all of the other of the at least one of uplink communication or downlink communication with the base station for the second duration in response to receiving the silencing instruction.

In Aspect 4, the method of any of Aspects 1-3 further includes transitioning from a higher power state to a lower power state for at least a portion of the first duration.

In Aspect 5, the method of any of Aspects 1-4 further includes transitioning from the lower power state to the higher power state after the first duration.

In Aspect 6, the method of any of Aspects 1-5 further includes that the refraining overlaps or includes at least one of a DRX cycle or a DTX cycle.

In Aspect 7, the method of any of Aspects 1-6 further includes transmitting a set of non-acknowledgement (NACK) feedback messages to the base station, wherein the silencing instruction is received based on the set of NACK feedback messages.

In Aspect 8, the method of any of Aspects 1-7 further includes that the first duration comprises at least one of a number of milliseconds, a number of slots, a number of subframes, a number of cycles associated with periodic traffic, a number of cycles associated with SPS traffic, or a configured grant.

In Aspect 9, the method of any of Aspects 1-8 further includes that the at least one of uplink communication or downlink communication comprises at least one of SPS traffic, an uplink configured grant, ACK feedback, or NACK feedback.

In Aspect 10, the method of any of Aspects 1-9 further includes that the silencing instruction is included in at least one of MAC-CE or a DCI message.

In Aspect 11, the method of any of Aspects 1-10 further includes that the silencing instruction comprises an index in at least one of the MAC CE or the DCI message, and the first duration is determined based on a preconfigured timer value that corresponds to the index.

In Aspect 12, the method of any of Aspects 1-11 further includes that the silencing instruction is received based on one or more periodic or semi-periodic occasions associated with reception of at least one of data or control information that are to be skipped by the base station.

Aspect 13 is a device including one or more processors and one or more memories in electronic communication with the one or more processors and storing instructions executable by the one or more processors to cause the device to implement a method as in any of Aspects 1-12.

Aspect 14 is a system or apparatus including means for implementing a method or realizing an apparatus as in any of Aspects 1-12.

Aspect 15 is a non-transitory computer readable storage medium storing instructions executable by one or more processors to cause the one or more processors to implement a method as in any of Aspect 1-12.

Aspect 16 is a method of wireless communication at a base station comprising determining a first duration to suspend at least one of uplink communication or downlink communication with a UE; transmitting, to the UE, a silencing instruction for the at least one of uplink communication or downlink communication indicating the first duration; and refraining from all of the at least one of uplink communication or downlink communication with the UE for the first duration based on transmitting the silencing instruction.

In Aspect 17, the method of Aspect 16 further includes that the silencing instruction is for both the uplink communication and the downlink communication, and the refraining from all of the at least one of uplink communication or downlink communication with the UE further includes refraining from all of both the uplink communication and the downlink communication with the UE for the first duration based on transmitting the silencing instruction.

In Aspect 18, the method of Aspect 16 or 17 further includes determining a second duration to suspend the other of the at least one of uplink communication or downlink communication, wherein the silencing instruction further indicates the second duration; and refraining from all of the other of the at least one of uplink communication or downlink communication with the UE for the second duration based on transmitting the silencing instruction.

In Aspect 19, the method of any of Aspects 16-18 further includes that the silencing instruction is configured to cause the UE to transition from a higher power state to a lower power state for at least a portion of the first duration, and to transition from the lower power state to the higher power state after the first duration.

In Aspect 20, the method of any of Aspects 16-19 further includes that the refraining overlaps or includes at least one of a DRX cycle or a DTX cycle.

In Aspect 21, the method of any of Aspects 16-20 further includes receiving a set of NACK feedback messages from the UE; and comparing a number of the set of NACK feedback messages to a threshold, wherein the silencing instruction is transmitted when the number of the set of NACK feedback messages satisfies the threshold.

In Aspect 22, the method of any of Aspects 16-21 further includes that the first duration comprises at least one of a number of milliseconds, a number of slots, a number of subframes, a number of cycles associated with periodic traffic, a number of cycles associated with SPS traffic, or a configured grant.

In Aspect 23, the method of any of Aspects 16-22 further includes that the at least one of uplink communication or downlink communication comprises at least one of SPS traffic, an uplink configured grant, ACK feedback, or NACK feedback.

In Aspect 24, the method of any of Aspects 16-23 further includes that the silencing instruction is included in at least one of MAC-CE or a DCI message.

In Aspect 25, the method of any of Aspects 16-24 further includes that the silencing instruction comprises an index in at least one of the MAC CE or the DCI message that corresponds to a preconfigured timer value at the UE.

In Aspect 26, the method of any of Aspects 16-25 further includes that the silencing instruction is transmitted based on one or more periodic or semi-periodic occasions associated with transmission of at least one of data or control information to the UE that are to be skipped.

Aspect 27 is a device including one or more processors and one or more memories in electronic communication with the one or more processors and storing instructions executable by the one or more processors to cause the device to implement a method as in any of Aspects 16-26.

Aspect 28 is a system or apparatus including means for implementing a method or realizing an apparatus as in any of Aspects 16-26.

Aspect 29 is a non-transitory computer readable storage medium storing instructions executable by one or more processors to cause the one or more processors to implement a method as in any of Aspect 16-26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a grant scheduling an uplink communication or a downlink communication, wherein the grant comprises at least one of a configured grant, a scheduled acknowledgement (ACK), or a scheduled non-ACK (HACK);
   receiving, from a base station, a silencing instruction for at least one of the uplink communication or the downlink communication;
   determining a first duration associated with the at least one of the uplink communication or the downlink communication based on the silencing instruction, wherein the silencing instruction is included in at least one of media access control (MAC) control element (CE) (MAC-CE) or a downlink control information (DCI) message, wherein the silencing instruction comprises an index in at least one of the MAC-CE or the DCI message, and the first duration is based on a preconfigured timer value that corresponds to the index; and
   refraining from either of the uplink communication or the downlink communication, scheduled by the grant, with the base station for the first duration in response to receiving the silencing instruction.

2. The method of claim 1, further comprising:
   determining a second duration associated with an other of the at least one of the uplink communication or the downlink communication based on the silencing instruction; and
   refraining from all of the other of the at least one of the uplink communication or the downlink communication with the base station for the second duration in response to receiving the silencing instruction.

3. The method of claim 1, further comprising:
   transitioning from a higher power state to a lower power state for at least a portion of the first duration.

4. The method of claim 3, further comprising:
   transitioning from the lower power state to the higher power state after the first duration.

5. The method of claim 1, wherein the refraining overlaps or includes at least one of a discontinuous reception (DRX) cycle or a discontinuous transmission (DTX) cycle.

6. The method of claim 1, further comprising:
   transmitting a set of non-acknowledgement (NACK) feedback messages to the base station,
   wherein the silencing instruction is received based on the set of NACK feedback messages.

7. The method of claim 1, wherein the first duration comprises at least one of a number of milliseconds, a number of slots, a number of subframes, a number of cycles associated with periodic traffic, a number of cycles associated with semi-periodic scheduling (SPS) traffic, or the configured grant.

8. The method of claim 1, wherein the at least one of the uplink communication or the downlink communication comprises at least one of semi-periodic scheduling (SPS) traffic, an uplink configured grant, acknowledgement (ACK) feedback, or non-ACK (NACK) feedback.

9. The method of claim 1, wherein the first duration is determined based on the preconfigured timer value that corresponds to the index.

10. The method of claim 1, wherein the silencing instruction is received based on one or more periodic or semi-periodic occasions associated with reception of at least one of data or control information that are to be skipped by the base station.

11. An apparatus for wireless communication at a user equipment (UE), comprising:
    a memory; and
    at least one processor coupled to the memory and configured to:
    receive a grant scheduling an uplink communication or a downlink communication, wherein the grant comprises at least one of a configured grant, a scheduled acknowledgement (ACK), or a scheduled non-ACK (NACK);
    receive, from a base station, a silencing instruction for at least one of the uplink communication or the downlink communication;
    determine a first duration associated with the at least one of the uplink communication or the downlink communication based on the silencing instruction wherein the silencing instruction is included in at least one of media access control (MAC) control element (CE) (MAC-CE) or a downlink control information (DCI) message, wherein the silencing instruction comprises an index in at least one of the MAC-CE or the DCI message, and the first duration is based on a preconfigured timer value that corresponds to the index; and
    refrain from either of the uplink communication or the downlink communication, scheduled by the grant, with the base station for the first duration in response to reception of the silencing instruction.

12. The apparatus of claim 11, wherein the at least one processor is further configured to:

determine a second duration associated with an other of the at least one of the uplink communication or the downlink communication based on the silencing instruction; and refrain from all of the other of the at least one of the uplink communication or the downlink communication with the base station for the second duration in response to reception of the silencing instruction.

13. The apparatus of claim 11, wherein the at least one processor is further configured to:

transition from a higher power state to a lower power state for at least a portion of the first duration.

14. A method of wireless communication at a base station, comprising:

transmitting, to a user equipment (UE), a grant scheduling an uplink communication or a downlink communication, wherein the grant comprises at least one of a configured grant, a scheduled acknowledgement (ACK), or a scheduled non-ACK (NACK);

determining a first duration to suspend at least one of the uplink communication or the downlink communication with a the UE;

transmitting, to the UE, a silencing instruction for the at least one of the uplink communication or the downlink communication indicating the first duration, wherein the silencing instruction is included in at least one of media access control (MAC) control element (CE) (MAC-CE) or a downlink control information (DCI) message, wherein the silencing instruction comprises an index in at least one of the MAC-CE or the DCI message, and the first duration is based on a preconfigured timer value that corresponds to the index; and refraining from either of the uplink communication or the downlink communication, scheduled by the grant, with the UE for the first duration based on transmitting the silencing instruction.

15. The method of claim 14, further comprising:

determining a second duration to suspend an other of the at least one of the uplink communication or the downlink communication, wherein the silencing instruction further indicates the second duration; and refraining from all of the other of the at least one of the uplink communication or the downlink communication with the UE for the second duration based on transmitting the silencing instruction.

16. The method of claim 14, wherein the silencing instruction is configured to cause the UE to transition from a higher power state to a lower power state for at least a portion of the first duration, and to transition from the lower power state to the higher power state after the first duration.

17. The method of claim 14, wherein the refraining overlaps or includes at least one of a discontinuous reception (DRX) cycle or a discontinuous transmission (DTX) cycle.

18. The method of claim 14, further comprising:

receiving a set of non-acknowledgement (NACK) feedback messages from the UE; and comparing a number of the set of NACK feedback messages to a threshold, wherein the silencing instruction is transmitted when the number of the set of NACK feedback messages satisfies the threshold.

19. The method of claim 14, wherein the first duration comprises at least one of a number of milliseconds, a number of slots, a number of subframes, a number of cycles associated with periodic traffic, a number of cycles associated with semi-periodic scheduling (SPS) traffic, or the configured grant.

20. The method of claim 14, wherein the at least one of the uplink communication or the downlink communication comprises at least one of semi-periodic scheduling (SPS) traffic, an uplink configured grant, an acknowledgement (ACK) feedback, or a non-ACK (NACK) feedback.

21. The method of claim 14, wherein the silencing instruction is transmitted based on one or more periodic or semi-periodic occasions associated with transmission of at least one of data or control information to the UE that are to be skipped.

22. An apparatus for wireless communication at a base station, comprising:

a memory; and at least one processor coupled to the memory and configured to:

transmit, to a user equipment (UE), a grant scheduling an uplink communication or a downlink communication, wherein the grant comprises at least one of a configured grant, a scheduled acknowledgement (ACK), or a scheduled non-ACK (NACK);

determine a first duration to suspend at least one of the uplink communication or the downlink communication with the UE;

transmit, to the UE, a silencing instruction for the at least one of the uplink communication or the downlink communication indicating the first duration, wherein the silencing instruction is included in at least one of media access control (MAC) control element (CE) (MAC-CE) or a downlink control information (DCI) message, wherein the silencing instruction comprises an index in at least one of the MAC-CE or the DCI message, and the first duration is based on a preconfigured timer value that corresponds to the index; and refrain from either of the uplink communication or the downlink communication, scheduled by the grant, with the UE for the first duration based on transmitting the silencing instruction.

23. The apparatus of claim 22, wherein the at least one processor is further configured to:

determine a second duration to suspend an other of the at least one of the uplink communication or the downlink communication, wherein the silencing instruction further indicates the second duration; and refrain from all of the other of the uplink communication or the downlink communication with the UE for the second duration based on transmission of the silencing instruction.

24. The method of claim 1, wherein the silencing instruction comprises the index and the first duration is determined based on the preconfigured timer value that corresponds to the index.

25. The apparatus of claim 11, wherein the silencing instruction comprises the index and the first duration is determined based on the preconfigured timer value that corresponds to the index.

26. The method of claim 14, wherein the silencing instruction comprises the index and the first duration is determined based on the preconfigured timer value that corresponds to the index.

27. The apparatus of claim 22, wherein the silencing instruction comprises the index and the first duration is determined based on the preconfigured timer value that corresponds to the index.

* * * * *